(12) United States Patent
Schilling

(10) Patent No.: US 11,505,670 B2
(45) Date of Patent: Nov. 22, 2022

(54) POLYURETHANE FOAMS CO-BLOWN WITH A MIXTURE OF A HYDROCARBON AND A HALOGENATED OLEFIN

(71) Applicant: Covestro LLC, Pittsburgh, PA (US)

(72) Inventor: Steven L. Schilling, Pittsburgh, PA (US)

(73) Assignee: Covestro LLC, Pittsburgh, PA (US)

( * ) Notice: Subject to any disclaimer, the term of this patent is extended or adjusted under 35 U.S.C. 154(b) by 148 days.

(21) Appl. No.: 15/354,069

(22) Filed: Nov. 17, 2016

(65) Prior Publication Data

US 2018/0134861 A1  May 17, 2018

(51) Int. Cl.
| | |
|---|---|
| *C08J 9/14* | (2006.01) |
| *C08J 9/00* | (2006.01) |
| *C08G 18/40* | (2006.01) |
| *C08G 18/09* | (2006.01) |
| *C08G 18/50* | (2006.01) |
| *C08G 18/48* | (2006.01) |
| *C08G 18/42* | (2006.01) |
| *C08G 18/76* | (2006.01) |

(52) U.S. Cl.
CPC .......... *C08J 9/149* (2013.01); *C08G 18/092* (2013.01); *C08G 18/4018* (2013.01); *C08G 18/4208* (2013.01); *C08G 18/4211* (2013.01); *C08G 18/4219* (2013.01); *C08G 18/482* (2013.01); *C08G 18/4883* (2013.01); *C08G 18/5024* (2013.01); *C08G 18/5033* (2013.01); *C08G 18/7657* (2013.01); *C08G 18/7664* (2013.01); *C08J 9/0061* (2013.01); *C08J 9/141* (2013.01); *C08J 9/144* (2013.01); *C08J 9/146* (2013.01); *C08G 2110/005* (2021.01); *C08G 2110/0025* (2021.01); *C08J 2201/022* (2013.01); *C08J 2203/14* (2013.01); *C08J 2203/142* (2013.01); *C08J 2203/144* (2013.01); *C08J 2203/162* (2013.01); *C08J 2203/182* (2013.01); *C08J 2205/052* (2013.01); *C08J 2205/10* (2013.01); *C08J 2375/04* (2013.01); *C08J 2375/08* (2013.01); *C08J 2483/00* (2013.01)

(58) Field of Classification Search
CPC .............. C08G 18/4018; C08G 18/42–4297
See application file for complete search history.

(56) References Cited

U.S. PATENT DOCUMENTS

| | | | |
|---|---|---|---|
| 3,215,652 A | 11/1965 | Kaplan | |
| 4,761,223 A * | 8/1988 | Klimpel | B03D 1/008 |
| | | | 209/166 |
| 5,124,366 A * | 6/1992 | Gluck | C08G 18/4247 |
| | | | 521/99 |
| 5,648,019 A * | 7/1997 | White, III | C08G 18/4018 |
| | | | 252/182.24 |
| 6,803,390 B2 | 10/2004 | Lekovic et al. | |
| 6,855,741 B2 * | 2/2005 | Wiese | C08G 18/3218 |
| | | | 252/182.24 |
| 7,972,524 B2 | 7/2011 | Robin | |
| 8,097,660 B2 | 1/2012 | Mautino et al. | |
| 8,133,419 B2 | 3/2012 | Burks et al. | |
| 8,163,196 B2 | 4/2012 | Basu et al. | |
| 8,658,708 B2 | 2/2014 | Loh et al. | |
| 9,000,061 B2 | 4/2015 | Ling et al. | |
| 2006/0175575 A1 * | 8/2006 | Kaplan | C08G 18/26 |
| | | | 252/182.24 |
| 2011/0037016 A1 | 2/2011 | Singh et al. | |
| 2011/0218261 A1 * | 9/2011 | Loh | C08G 18/5027 |
| | | | 521/117 |
| 2011/0315915 A1 | 12/2011 | Abbas et al. | |
| 2012/0161063 A1 | 6/2012 | Singh | |
| 2013/0149452 A1 | 6/2013 | Bogdan et al. | |
| 2014/0178312 A1 | 6/2014 | Basu et al. | |
| 2014/0213679 A1 * | 7/2014 | Albers | C08G 18/4829 |
| | | | 521/173 |
| 2014/0346390 A1 | 11/2014 | Basu et al. | |
| 2014/0357747 A1 | 12/2014 | Loh et al. | |
| 2015/0322225 A1 * | 11/2015 | Williams | C08J 9/142 |
| | | | 521/98 |
| 2016/0200889 A1 | 7/2016 | Parenti et al. | |
| 2016/0369077 A1 | 12/2016 | Hu et al. | |

FOREIGN PATENT DOCUMENTS

| | | |
|---|---|---|
| CN | 104 119 490 A | 10/2014 |
| CN | 104 497 254 A | 4/2015 |
| CN | 104 530 360 A | 4/2015 |
| CN | 104 530 361 A | 4/2015 |
| CN | 104 628 978 A | 5/2015 |
| CN | 104 672 420 A | 6/2015 |
| CN | 104 672 426 A | 6/2015 |
| CN | 105 038 182 A | 11/2015 |

(Continued)

OTHER PUBLICATIONS

Murphy, John. Long-term aging of closed-cell foam insulation. Cellular Polymers, 2010, 29, 313-326. (Year: 2010).*

Booth, L. D. and Lee, W. M. Effects of polymer structure on k-factor aging of rigid polyurethane foam. Journal of Cellular Plastics, Jan.-Feb. 26-30, 1985. (Year: 1985).*

King et al. Relationship of k-factor versus density for various appliance foam formulations containing next generation blowing agents. Journal of Cellular Plastics, 1996, 32, 355-366. (Year: 1996).*

Sinteco. Solstice LBA Information. Nov. 2019. (Year: 2019).*

(Continued)

*Primary Examiner* — Stephen E Rieth
(74) *Attorney, Agent, or Firm* — Donald R. Palladino

(57) ABSTRACT

This invention relates to rigid polyurethane foams which are co-blown with a mixture of a hydrocarbon blowing agent and a halogenated olefin blowing agent. This invention also relates to a process for preparing these rigid polyurethane foams, and to an isocyanate-reactive component containing a polyol blend and the mixture of blowing agents. Phase stable isocyanate-reactive blends are also described.

14 Claims, No Drawings

(56) References Cited

FOREIGN PATENT DOCUMENTS

| CN | 105 601 978 A | 5/2016 | | |
|---|---|---|---|---|
| CN | 105 985 503 A | 10/2016 | | |
| CN | 106 496 494 A | 3/2017 | | |
| WO | WO-2009078725 A1 | * | 6/2009 | ......... C08G 18/4018 |
| WO | WO-2014037476 A1 | * | 3/2014 | ......... C08G 18/4018 |
| WO | WO-2015143260 A1 | * | 9/2015 | ............. C08G 18/14 |

OTHER PUBLICATIONS

Schilling, Steven L. et al; "Optimization of Polyurethane Rigid Foams Co-Blown with Cyclopentane and Halogenated Olefin Blowing Agents"; 2015 American Chemistry Council; Covestro LLC (Pittsburgh, PA).

Loh, Gary et al; "Formacel® 1100—a HFO with Unique Characteristics for Polyurethane Foam Applications"; 2014 American Chemistry Council; DuPont Fluorochemicals and DuPont Company (Wilmington, DE).

Schilling, Steven et al; "Optimization of Polyurethane Rigid Foams Co-Blown with Cyclopentane and Halogenated Olefin Blowing Agents"; Polyurethanes Technical Conference—Oct. 5-7, 2015, Gaylord Palms Resort and Convention Center, Orlando, FL USA.

Tauchen, Robert et al; "Optimizing Surfactant Technology for Blends of Blowing Agents in Next Generation Appliance Formulations"; pp. 1-14; Evonik Goldschmidt Corporation (Hopewell, VA) and Evonik Industries (Essen, Germany), presented at the CPI Technical Conference 2013.

Bowman, James M.; "Cold Chain Industry: Energy Efficiency Solutions Solstice® LBA / Cyclopentane Blend Performance"; pp. 1-9; Honeywell International (Buffalo, NY) and Bayer de Mexico, S.A. de C.V. (Santa Clara, Mexico), presented at the CPI Technical Conference 2014.

Thomaz, Geraldo L. et al; "Formacel® 1100 (FEA-1100), a Zero ODP and Low GWP Foam Expansion Agent for the Appliance Industry"; Whirlpool Corporation (Joinville SC Brazil), Dow Brazil Sudeste Industrial (Sao Paulo, SP Brazil), DuPont Company (Wilmington, DE) and DuPont Argentina SA (Buenos Aires, Argentina), presented at the CPI Technical Conference 2014.

* cited by examiner

POLYURETHANE FOAMS CO-BLOWN WITH A MIXTURE OF A HYDROCARBON AND A HALOGENATED OLEFIN

TECHNICAL FIELD

This invention relates generally to isocyanate-reactive compositions comprising a blowing agent blend which are useful for preparing rigid polyurethane foams. This invention also relates to rigid polyurethane foams prepared from these isocyanate-reactive components and to a process for preparing these rigid polyurethane foams.

BACKGROUND

Rigid polyurethane foams are widely known and used in numerous industries. These foams are produced by reacting an appropriate polyisocyanate and an isocyanate-reactive compound, usually a polyol, in the presence of a blowing agent. One use of such foams is as a thermal insulation medium in the construction of refrigerated storage devices. The thermal insulating properties of closed-cell rigid foams are dependent upon a number of factors including the density and average cell size of the foam and the vapor thermal conductivity of the contents of the cells. Chlorofluorocarbons (CFC's) were historically used as blowing agents to produce these insulating foams because of their exceptionally low vapor thermal conductivity. However, CFC's are now known to contribute to the depletion of ozone in the stratosphere and, as a result, mandates have been issued which prohibit their use.

Initially, the most promising alternatives to CFC's appeared to be hydrogen-containing chlorofluorocarbons (HCFC's). While HCFC's, such as HCFC 141b, have been used as alternatives to CFC's, they have also been found to have some ozone-depletion potential. There is, therefore, mounting pressure to find substitutes for HCFC's as well as CFC's.

Alternative blowing agents such as hydrofluorocarbons (HFC's) and hydrocarbons (HC's), which do not pose a threat to the ozone layer because they do not contain chlorine, are currently favored. Neither of these two classes of materials, however, have all the attributes of "ideal" blowing agents. That is, although HFC's and HC's are environmentally more acceptable than CFC's and HCFC's, they are frequently inferior in certain physical properties such as vapor thermal conductivity, solubility, flammability, and boiling point. For example, many of the HFC's and HC's are gases at room temperature which makes them difficult to handle, and many are flammable, thus requiring changes to the foam processing methods and equipment and/or increased risks in their handling and use as blowing agents.

In addition, HFC's such as, for example, HFC 245fa, have high Global Warming Potentials (GWP's) which contribute to climate change. It is therefore anticipated that HFC 245fa and other HFC's will be banned in the United States beginning in 2020.

Thus, there remains an unfulfilled need in the art to develop rigid polyurethane foam systems which do not utilize CFC's, HCFC's or HFC's, but which produce foams with a good balance of properties including excellent thermal conductivity, a high closed cell content and a low density, while maintaining acceptable compressive strength and dimensional stability, and which require few changes to the existing foam-forming processes and equipment. Because most commercial foaming processes employ a pre-blend of the polyol, additives, and blowing agent, it is important that the isocyanate reactive blends are phase stable and do not separate over time.

SUMMARY OF THE INVENTION

Embodiments disclosed herein are directed to phase stable isocyanate-reactive components comprising a blend of blowing agents, to rigid foams made from these isocyanate-reactive components which comprise a blend of blowing agents, and to a process for preparing these rigid foams, which eliminate the use of HFC's yet provide rigid polyurethane foams having excellent thermal conductivity, a high dosed cell content, and a low density, all while maintaining acceptable compressive strength and dimensional stability. Thus, the present invention provides a phase stable isocyanate-reactive component comprising a blowing agent blend comprising one or more hydrocarbons and one or more halogenated olefin compounds.

These and other embodiments which will be apparent to those skilled in the art are accomplished by reacting an organic polyisocyanate component with an isocyanate-reactive component in the presence of a blowing agent blend, water, one or more catalysts, and one or more silicon surfactants. The isocyanate-reactive component comprises a polyol blend comprising one or more polyether polyols having an average functionality of 4 to 6, a hydroxyl number of from 300 to 550 mg KOH/g, and which comprises a saccharide initiator; one or more aromatic amine initiated polyether polyols having a functionality of from 3 to 5 and a hydroxyl number of 250 to 500 mg KOH/g; and one or more aromatic polyester polyols having a functionality of about 1.5 to about 3 and a hydroxyl number of 150 to 410 mg KOH/g; wherein the polyol blend (1) comprises less than 15% by weight of the aromatic polyester polyol, and/or less than 18% by weight of ethylene oxide, based on 100% by weight of components (a) and (b) in the polyol blend. The blowing agent blend may include one or more hydrocarbon blowing agents which contains from 4 to 6 carbon atoms; and one or more halogenated olefin compounds which contains 3 or 4 carbon atoms, at least one carbon-carbon double bond, and has a boiling point of −25° C. to 40° C. Additionally, the composition may further comprise water, one or more catalysts such as tertiary amines or organometallic compounds; and one or more silicon surfactants.

DETAILED DESCRIPTION OF THE INVENTION

The present invention will now be described for purposes of illustration and not limitation. It is to be understood that certain descriptions of the disclosed embodiments have been simplified to illustrate only those steps, elements, features, and aspects that are relevant to a clear understanding of the disclosed embodiments, while eliminating, for purposes of clarity, other steps, elements, features, and aspects. Persons having ordinary skill in the art, upon considering the present description of the disclosed embodiments, will recognize that other steps, elements, and/or features may be desirable in a particular implementation or application of the disclosed embodiments. However, because such other steps, elements, and/or features may be readily ascertained by persons having ordinary skill upon considering the present description of the disclosed embodiments, and are not necessary for a complete understanding of the disclosed embodiments, a description of such steps, elements, and/or features is not provided herein. As such, it is to be understood that the description set forth herein is merely exemplary and illustrative of the disclosed embodiments and is not intended to limit the scope of the invention as defined solely by the claims.

Except in the operating examples, or where otherwise indicated, all numerical parameters are to be understood as being prefaced and modified in all instances by the term "about", in which the numerical parameters possess the inherent variability characteristic of the underlying measurement techniques used to determine the numerical value of the parameter. Examples of such numerical parameters include, but are not limited to hydroxyl numbers (OH numbers), equivalent and/or molecular weights, functionalities, amounts, percentages, etc. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. All end points of any range are included unless specified otherwise. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are inherently described in this specification such that amending to expressly recite any such sub-ranges would comply with the requirements of 35 U.S.C. § 112 and 35 U.S.C. § 132(a).

The grammatical articles "a", "an", and "the", as used herein, are intended to include "at least one" or "one or more", unless otherwise indicated, even if "at least one" or "one or more" is used in certain instances. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Equivalent weights and molecular weights given herein in Daltons (Da) are number average equivalent weights and number average molecular weights respectively, unless indicated otherwise.

The term "functionality" is used herein to refer to the average number of reactive hydroxyl groups, —OH, present per molecule of the polyol or polyol blend being described. In the production of polyurethane foams, the hydroxyl groups react with isocyanate groups, —NCO, that are attached to the isocyanate compound. The term "hydroxyl number" or "OH number" refers to the number of reactive hydroxyl groups available for reaction, and is expressed as the number of milligrams of potassium hydroxide equivalent to the hydroxyl content of one gram of the polyol (ASTM D4274-16). The term "equivalent weight" refers to the molecular weight of a compound divided by its valence or functionality. For a polyol, the equivalent weight is the weight of the polyol that will combine with one mole of isocyanate groups, and may be calculated by dividing the molecular weight of the polyol by its functionality. The equivalent weight of a polyol may also be calculated by dividing 56,100 by the hydroxyl number of the polyol as illustrated by the formula:

Equivalent Weight (g/eq)=56,100(mg KOH/eq)/OH number (mg KOH/g).

As used herein, the term saccharide means a simple sugar, combination of sugars, or polymerized sugars; or a carbohydrate. It has surprisingly been found that a blend of blowing agents comprising one or more hydrocarbons which contain from 4 to 6 carbon atoms and one or more halogenated olefin compounds which contain 3 or 4 carbon atoms, at least one carbon-carbon double bond and has a boiling point of −25° C. to 40° C. is particularly advantageous in a rigid foam forming composition because it is capable of forming a phase stable isocyanate-reactive blend. In addition, this phase stable isocyanate-reactive blend is capable of forming a rigid polyurethane foam which may exhibit good thermal conductivity at 35° F. (1.7° C.). This low temperature thermal conductivity is especially important in allowing refrigerators and freezers to meet their energy usage requirements.

As used herein, the term phase stable means that the isocyanate-reactive component will not separate when stored for 7 days at about 70° F. (or 21° C.).

The present invention provides an isocyanate-reactive blend which is phase stable and which forms rigid polyurethane foam when reacted with an organic isocyanate. The isocyanate-reactive blend comprises (1) a polyol blend comprising (a) from 20 to 50% by weight, based on 100% by weight of (1) the polyol blend, of one or more polyether polyols having a functionality of from 4 to 6, having an OH number of from 300 to 550 mg KOH/g and which comprises a saccharide initiator; (b) from 40 to 55% by weight, based on 100% by weight of (1) the polyol blend, of one or more aromatic amine-initiated polyether polyols having a functionality of from 3 to 5 and an OH number of from 250 to 500 mg KOH/g, and (c) from about 10 to about 25% by weight, based on 100% by weight of (1) the polyol blend, of one or more aromatic polyester polyols having an OH number of 150 to 410 mg KOH/g and a functionality of about 1.5 to about 3; and (2) a blowing agent blend comprising (a) 25 to 75% by weight of one or more hydrocarbon blowing agents which contain from 4 to 6 carbon atoms, and (b) 25 to 75% by weight of one or more halogenated olefin compounds which contain 3 or 4 carbon atoms, at least one carbon-carbon double bond, and has a boiling point of −25° C. to 40° C. This isocyanate-reactive component may optionally comprise one or more of the following components: (3) water; (4) one or more catalysts and/or (5) one or more silicon surfactants.

The present invention also provides a rigid foam comprising the reaction product of (A) one or more organic diisocyanates or polyisocyanates; with (B) an isocyanate-reactive component comprising (1) a polyol blend; (2) a blowing agent blend; (3) water; (4) one or more catalysts and (5) one or more silicon surfactants. The polyol blend and blowing agent blend are as described above.

In another embodiment, the invention also provides a process for the preparation of a rigid foam by reacting (A) one or more organic diisocyanates or polyisocyanates; with (B) an isocyanate-reactive component comprising (1) a polyol blend; (2) a blowing agent blend; (3) water; (4) one or more catalysts and (5) one or more silicon surfactants, wherein the polyol blend and blowing agent blend are as described above.

Any of the known organic isocyanates, modified isocyanates or isocyanate-terminated prepolymers made from any of the known organic isocyanates may be used in the foam-forming composition of the present invention. Suitable organic isocyanates include aromatic, aliphatic, and cycloaliphatic polyisocyanates and combinations thereof. Useful isocyanates include: diisocyanates such as m-phenylene diisocyanate, p-phenylene diisocyanate, 2,4-toluene diisocyanate, 2,6-toluene diisocyanate, 1,5-pentamethylene diisocyanate, 1,6-hexamethylene diisocyanate, 1,4-hexamethylene diisocyanate, 1,3-cyclohexane diisocyanate, 1,4-cyclohexane diisocyanate, isomers of hexahydrotoluene diisocyanate, isophorone diisocyanate, dicyclohexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyldiphenylpropane-4,4'-diisocyanate; triisocyanates such as 2,4,6-toluene triisocyanate; and polyisocyanates such as 4,4'-dimethyldiphenylmethane-2,2',5,5'-tetraisocyanate and the polymethylene polyphenyl polyisocyanates.

Undistilled or crude polyisocyanates may also be used in the foam-forming composition of the present invention. The crude toluene diisocyanate obtained by phosgenating a mixture of toluene diamines and the crude diphenylmethane diisocyanate obtained by phosgenating crude diphenylmethanediamine (polymeric MDI) are examples of suitable crude polyisocyanates. Suitable undistilled or crude polyisocyanates are described in U.S. Pat. No. 3,215,652, the disclosure of which is herein incorporated by reference.

Suitable isocyanates for the invention will typically have an NCO group content of from at least about 25 weight percent up to about 35 weight percent (ASTM D-2572-97 (2010)). The suitable isocyanates will typically have an NCO group content of at least about 25 weight percent, or at least about 29 weight percent, or at least about 30 weight percent. These isocyanates will also typically have an NCO group content of about 35 weight percent or less, or of about 34 weight percent or less, or of about 33 weight percent or less. Thus, suitable isocyanates may have an NCO group content that ranges between any combination of these upper and lower values, inclusive, such as, from at least about 25 to about 35 weight percent, or from at least about 29 to about 34 weight percent, or from at least about 30 to about 33 weight percent.

Modified isocyanates are obtained by chemical reaction of diisocyanates and/or polyisocyanates. Modified isocyanates useful in the practice of the present invention include isocyanates containing ester groups, urea groups, biuret groups, allophanate groups, carbodiimide groups, isocyanurate groups, uretdione groups and/or urethane groups. Examples of modified isocyanates include prepolymers containing NCO groups and having an NCO content of from 25 to 35 weight percent, or from 29 to 34 weight percent, or from 30 to 33 weight percent and particularly those based on polyether polyols or polyester polyols and diphenylmethane diisocyanate. Processes for the production of these prepolymers are known in the art.

In embodiments of the foam-forming composition of the present invention, useful polyisocyanates include methylene-bridged polyphenyl polyisocyanates and prepolymers of methylene-bridged polyphenyl polyisocyanates having an NCO content of from 25 to 35 weight percent, due to their ability to cross-link the polyurethane. Polyisocyanates useful for the present invention may have a viscosity in the range of about 100 to about 500 mPa·s at 25° C.

Suitable isocyanate-reactive components (B) comprise (1) a polyol blend comprising (a) one or more polyether polyols which comprises a saccharide initiator, (b) one or more aromatic amine initiated polyether polyols, and (c) one or more aromatic polyester polyols; (2) a blowing agent blend comprising (a) a hydrocarbon blowing agent which contains from 4 to 6 carbon atoms, and (b) a halogenated olefin blowing agents which contains 3 or 4 carbon atoms, at least one carbon-carbon double bond and has a boiling point of −25° C. to 40° C.; (3) water, (4) one or more catalysts; and (5) one or more silicon surfactants.

Suitable polyol blends (1) for the isocyanate-reactive component (B) of the invention may comprise: (a) from 20 to 50% by weight, based on 100% by weight of (1) the polyol blend, of one or more saccharide initiated polyether polyols having a functionality of from 4 to 6 and having an OH number of from 300 to 550, (b) from 40 to 55% by weight, based on 100% by weight of (1) the polyol blend, of one or more aromatic amine-initiated polyether polyols having a functionality of from 3 to 5 and an OH number of from 250 to 500, and (c) from about 10 to about 25% by weight, based on 100% by weight of (1) the polyol blend, of one or more aromatic polyester polyols having an OH number of 150 to 410 and a functionality of about 1.5 to about 3. As is evident to one of ordinary skill in the art, when only components (a), (b) and (c) are present in the polyol blend (1), the sum of the %'s by weight of components (a), (b) and (c) totals 100% by weight of the polyol blend. However, when components (a), (b), and (c) are all present at their minimum levels, up to 30% of other isocyanate reactive materials could be present.

In one embodiment, the polyol blend (1) may additionally comprise other isocyanate-reactive group containing compounds such as low molecular weight chain extenders and/or crosslinking agents, as well as other higher molecular weight polyethers and polyesters that do not correspond to the individual components described above. If additional isocyanate-reactive group containing compounds are present in the polyol blend, the sum of the %'s by weight of (a), (b), (c) and of these other compounds totals 100% by weight of the polyol blend (1).

The polyether polyols (a) of the polyol blend (1) may be present in amounts ranging from 20 to 50% by weight, based on 100% by weight of the polyol blend. Suitable polyether polyols typically have OH numbers of at least about 300, or at least about 350, or at least about 360. The polyether polyols also typically have OH numbers of about 550 or less, or about 525 or less, or about 500 or less. The suitable polyether polyols may have an OH number ranging between any combination of these upper and lower values, inclusive, such as, for example, of about 300 to about 550, or of about 350 to about 525, or of about 360 to about 500. Suitable polyether polyols also generally have functionalities of at least about 4, or of at least about 4.5. The functionality of the polyether polyols is also typically about 6 or less, or about 5.5 or less. Thus, the functionality of the suitable polyether polyols may range between any combination of these upper and lower values, inclusive, such as, for example, from at least about 4 to about 6, or from at least about 4.5 to about 5.5.

Some examples of suitable polyether polyols include those which are prepared by reacting at least one alkylene oxide with one or more suitable starter compounds in the presence of a suitable catalyst, in which the starter compounds comprise one or more saccharide initiators.

Examples of suitable alkylene oxides include ethylene oxide, propylene oxide, butylene oxide, styrene oxide, epichlorohydrin, or mixtures thereof, etc. In accordance with the present invention, suitable starter compounds for (a) include one or more saccharide initiators. Some examples of such saccharide initiator compounds include sucrose, sorbitol, maltitol, etc. as well as other mono-saccharides, di-saccharides, tri-saccharides and polysaccharides which are known to those of ordinary skill in the art. Other initiator compounds are often used in combination with the saccharide initiator to prepare the polyether polyols (a). Saccharides can be co-initiated with for example, compounds such as water, propylene glycol, glycerin, ethylene glycol, ethanol amines, diethylene glycol, etc. and mixtures thereof, to form the polyether polyols (a). As is apparent to one of ordinary skill in the art, it is possible to use a wide variety of individual initiator compounds in combination with one another in which the functionality of the individual initiator compounds does not fall within the functionalities set forth above, provided that the average functionality of the mixture of initiator compounds satisfies the overall functionality range disclosed above. For example, a polyether polyol that comprises both a sucrose initiator and another initiator such as propylene glycol, is suitable for use as the polyether polyol even though neither starter has a functionality between 4 and 6, (a) provided that the overall average functionality of the polyether polyol satisfies the above functionality requirements.

Aromatic amine initiators are not suitable initiators for polyether polyols used as (a) in the required polyol blend.

Some examples of suitable catalysts which can be used to prepare the polyether polyols (a) include basic catalysts (such as sodium or potassium hydroxide or tertiary amines such as methyl imidazole), double metal cyanide (DMC) catalysts, etc.

Suitable aromatic amine initiated polyether polyols (b) typically have OH numbers of from about 250 to about 500 and functionalities of about 3 to about 5. The aromatic amine initiated polyether polyols will, in general, have an OH number of at least about 300, or at least about 340. The OH number of the aromatic amine initiated polyether polyols is also typically no more than about 500, or no more than about 450, or no more than about 420. These aromatic amine initiated polyether polyols will typically have an OH number ranging between any combination of these upper and lower values, inclusive, such as, for example, from about 250 to about 500, or from about 300 to about 450, or from about 340 to about 420. These aromatic amine initiated polyether polyols will also typically have a functionality ranging between the upper and lower values, inclusive, such as, for example, of at least about 3 to about 5 or less. The nominal functionality of an aromatic diamine initiated polyether polyol will be about 4.

Suitable aromatic amine initiated polyether polyols (b) are typically the reaction product of a mixture comprising one or more alkylene oxides with one or more aromatic amine compounds in the presence of one or more suitable catalysts. Examples of suitable alkylene oxides include ethylene oxide, propylene oxide, butylene oxide, styrene oxide, epichlorohydrin, etc. Some examples of suitable aromatic amines which may be initiators for (b) include compounds such as, 2,3-toluene diamine, 3,4-toluene diamine, 2,4-toluene diamine, and 2,6-toluene diamine or mixtures thereof, 4,4'-methylene dianiline, methylene-bridged polyphenyl polyamines composed of isomers of methylene dianilines and triamines or polyamines of higher molecular weight prepared by reacting aniline with formaldehyde by methods known in the art, etc. Typically, two hydroxyl groups are formed for each primary amine group that is alkoxylated, so that a diamine, such as toluene diamine would react with ethylene or propylene oxide to form a polyol with a nominal functionality of 4. Suitable catalysts for preparing the aromatic amine initiated polyether polyols include basic catalysts (hydroxides, tertiary amines), DMC (double metal cyanide) catalysts, etc.

Aromatic polyester polyols to be used as component (c) of the polyol blend (B) typically have an OH number of from about 150 to about 410 and a functionality of about 1.5 to about 3. These aromatic polyester polyols typically have an OH number of at least about 150, or at least about 200, or at least about 225. The OH number of these aromatic polyester polyols is also typically about 410 or less, or about 360 or less or about 335 or less. Thus, the aromatic polyester polyol may have an OH number ranging between any combination of these upper and lower values, inclusive, such as, for example, from about 150 to about 410, or from about 200 to about 360, or from about 200 to about 225. The aromatic polyester polyols may also have a functionality of at least about 1.5, or at least about 1.9. The functionality of the aromatic polyester polyol is also typically about 3 or less, or about 2.5 or less. Thus, the aromatic polyester polyol will in general have a functionality ranging between any combination of these upper and lower values, inclusive, such as, for example, from at least about 1.5 to about 3, or from at least about 1.9 to about 2.5.

Examples of suitable polyester polyols for component (c) of the polyol blend herein include those which are the reaction product of an aromatic diacid or anhydride with a suitable glycol or triol. For example, polyester polyols can be the reaction product of ethylene glycol, propylene glycol, butylene glycol, 1,3-butanediol, neopentyl glycol, diethylene glycol, dipropylene glycol, triethylene glycol, tripropylene glycol, glycerol, trimethylolethane, trimethyolpropane, pentanediol, hexanediol, heptanediol, 1,3- and 1,4-dimethylol cyclohexane and mixtures thereof, etc. with an aromatic diacid or aromatic anhydride such as, for example, phthalic acid, isophthalic acid, terephthalic acid, or phthalic anhydride, etc. Some of examples of the suitable aromatic polyester polyols include those compounds which are available from Stepan Chemical under the Stepanpol trade name such as, for example, Stepanpol® PS 3024 and Stepanpol PS 2502A or from Invista under the Terate trade name, such as Terate® HT5100, or from Coim under the Isoexter trade name such as Isoexter® TB-265.

Examples of additional compounds that contain isocyanate-reactive groups which may also be present in the polyol blend include chain extenders and/or crosslinking agents, and higher molecular weight polyether polyols and polyester polyols not described above. Chain extenders and/or crosslinking agents include, for example, ethylene glycol, propylene glycol, butylene glycol, glycerol, diethylene glycol, dipropylene glycol, dibutylene glycol, trimethylolpropane, pentaerythritol, ethylene diamine, diethyltoluenediamine, etc.

In one embodiment, the polyol blend (1) comprises less than 15% by weight of (c) the aromatic polyester polyol, and/or less than 18% by weight of ethylene oxide, based on 100% by weight of components (a) and (b) present in the polyol blend.

In another embodiment, the polyol blend (1) comprises at least 10% by weight of (c) the aromatic polyester polyol, and/or less than 4% by weight of ethylene oxide, based on 100% by weight of components (a) and (b) present in the polyol blend.

In one embodiment, the polyol blend (1) comprises at least 10% by weight of (c) the aromatic polyester polyol, and is used to prepare a rigid foam in which the foam has a k-factor of less than 0.126 BTU-in/hr-ft$^2$-° F. at 35° C.

The blowing agent blend (2) suitable for the invention comprises (a) 25 to 75% by weight of one or more hydrocarbon blowing agents which contain from 4 to 6 carbon atoms, and (b) 25 to 75% by weight of one or more halogenated olefin compounds which contain 3 or 4 carbon atoms, at least one carbon-carbon double bond, and has a boiling point of −25° C. to 40° C. When the blowing agent blend only comprises these two components, the sum of (a) and (b) totals 100% by weight of (2) the blowing agent blend. The blowing agent blend may, however, additionally comprise other blowing agents.

The blowing agent blend may comprise (a) at least 25% by weight, or at least 40% by weight of one or more hydrocarbon blowing agents which contain from 4 to 6 carbon atoms. The blowing agent blend may also comprise (a) no more than 75% by weight, or no more than 60% by weight, of one or more hydrocarbon blowing agents which contain from 4 to 6 carbon atoms. The quantity of one or more hydrocarbon blowing agents present in the blend of blowing agents may range between any combination of these upper and lower values, inclusive, such as, for example, from 25% to 75%, or from 25% to 60%, or from 40% to 60% by weight.

In addition, the blowing agent blend may comprise (b) at least 25% by weight, or at least 40% by weight of one or more halogenated olefin compounds which contain 3 or 4 carbon atoms, at least one carbon-carbon double bond, and has a boiling point of −25° C. to 40° C. The blowing agent blend may also comprise (b) no more than 75% by weight, or no more than 60% by weight, of one or more halogenated olefin compounds which contain 3 or 4 carbon atoms, at least one carbon-carbon double bond, and has a boiling point of −25° C. to 40° C. The quantity of one or more halogenated olefin compounds which contain 3 or 4 carbon atoms, at least one carbon-carbon double bond, and has a boiling point of −25° C. to 40° C. present in the blend of blowing agents may range between any combination of these upper and lower values, inclusive, such as, for example, from 25% to 75%, or from 40% to 60%, or from 40% to 60% by weight.

Suitable hydrocarbon blowing agents for component (a) of the blowing agent blend (2) include, for example, hydrocarbons which contain from 4 to 6 carbon atoms. These hydrocarbon blowing agents are typically free of carbon-carbon double bonds and are free of halogen atoms. Examples of suitable hydrocarbons include butane, n-pentane, cyclopentane, hexane, isopentane (i.e. 2-methylbutane), etc.

In one embodiment, the hydrocarbon blowing agents herein contain 5 carbon atoms. Compounds including n-pentane, 2-methylbutane, and cyclopentane are examples of suitable hydrocarbon blowing agents with 5 carbon atoms.

Component (b) of the blowing agent blend (2) comprises one or more halogenated olefin compounds which contain 3 or 4 carbon atoms, at least one carbon-carbon double bond, and has a boiling point of −25° C. to 40° C. Some examples of such compounds include trans-1-chloro-3,3,3-trifluoropropene (or HCFO 1233zd(E)), cis-1,1,1,4,4,4-hexafluorobutene (or HFO 1336mzz(Z)), and trans-1,1,1,3-tetrafluoropropene (or HFO 1234ze(E)). Mixtures of these compounds may also be used. The boiling point of the halogenated olefin compound is typically at least −25° C., or at least −20° C., or at least −19° C. The boiling point of the halogenated olefin is also typically 40° C. or less, or 35° C. or less, or 33° C. or less. The halogenated olefin blowing agent may have a boiling point between any combination of these upper and lower ranges, inclusive, such as, for example, of −25° C. to 40° C., or of −20° C. to 35° C., or of −19° C. to 33° C.

In one embodiment, the isocyanate-reactive component (B) may comprise (3) from about 0.5 to about 3.0% by weight of water, based on 100% by weight of (B). The amount of water may also range from about 0.8 to about 2.5 by weight, based on 100% by weight of (B).

One or more catalysts (4) may be present in the isocyanate-reactive component (B) of the present invention. A wide variety of materials are known to catalyze polyurethane forming reactions, including tertiary amines, tertiary phosphines, various metal chelates, acid metal salts, strong bases, various metal alcoholates and phenolates, and metal salts of organic acids. In various embodiments of the present invention, the urethane-forming catalysts include organotin catalysts and/or tertiary amine catalysts, which may be used singly or in some combination. For example, a combination of at least one "blowing" catalyst, which strongly promotes the reaction of an isocyanate group with a water molecule to form carbon dioxide, and either at least one "gelling" catalyst, which strongly promotes the reaction of an alcohol group with an isocyanate to form the urethane, or at least one trimerization catalyst, may be used in the present invention.

Specific examples of suitable tertiary amine catalysts include: pentamethyldiethylenetriamine, N,N-dimethylcyclohexylamine, N,N',N"-tris(3-dimethylaminopropyl-)hexahydrotriazine, tetramethylethylenediamine, tetraethylene diamine and benzyldimethylamine. In certain embodiments, useful tertiary amine catalysts include pentamethyldiethylenetriamine, N,N',N"-dimethylaminopropyl-hexahydrotriazine, and N,N-dimethylcyclohexylamine. Specific examples of suitable organometallic catalysts include dibutyltin dilaurate, dibutyltin diacetate, stannous octoate, potassium octoate, and potassium acetate.

The catalysts may be used at from 0.01 to 3.0 weight percent, or 0.3 to 2.5 weight percent, based on the total weight of the isocyanate reactive composition (B).

When preparing polyurethane-based foams, it is generally helpful to employ a minor amount of a surfactant (5) to stabilize the foaming reaction mixture until it obtains rigidity. Such surfactants advantageously comprise an organosilicon compound such as polysiloxane-polyalkyene-block copolymers, such as a polyether-modified polysiloxane. Other useful surfactants include polyethylene glycol ethers of long chain alcohols, tertiary amine or alkanolamine salts of long chain alkyl acid sulfate esters, alkylsulfonic esters, or alkylarylsulfonic acids. Such surfactants are employed in amounts sufficient to stabilize the foaming reaction mixture against collapse and the formation of large and uneven cells. Typically, 1.0 to 4.0 weight percent of the surfactant, based on the total weight of the isocyanate reactive composition (B), is sufficient for this purpose.

Additional materials which may optionally be included in the foam-forming compositions of the present invention include: chain extenders, crosslinking agents, pigments, colorants, fillers, antioxidants, flame retardants, and stabilizers.

The present invention also provides a process for the production of rigid polyurethane foams with a blend of blowing agents. In the process of the present invention (A) an organic isocyanate is reacted with (B) an isocyanate-reactive composition that includes (1) a polyol blend comprising (a) at least one saccharide initiated polyether polyol (b) at least one aromatic amine initiated polyether polyol and (c) at least one aromatic polyester polyol; (2) a blowing agent blend comprises a hydrocarbon blowing agent which contains from 4 to 6 carbon atoms, and a halogenated olefin compound which contains 3 to 4 carbon atoms, at least one carbon-carbon double bond and has a boiling point of $-25^2$C to $40^2$C; (3) water; (4) a catalyst, and (5) a silicon surfactant. Optionally, other additives selected from the group comprising flame retardants, chain extenders, crosslinking agents, pigments, colorants, fillers, antioxidants, and stabilizers can be included. In certain embodiments of the process, the blowing agent blend may comprise cyclopentane, and a halogenated olefin selected from the group consisting of: trans-1-chloro-3,3,3-trifluoropropene (or HCFO 1233zd (E)), cis-1,1,1,4,4,4-hexafluorobutene (or HFO 1336mzz (Z)) and trans-1,1,1,3-tetrafluoropropene (or HFO 1234ze (E)).

The process described may be employed to produce rigid polyurethane foams. In certain embodiments, (1) the polyol blend of the isocyanate-reactive component (B) may be reacted with an organic polyisocyanate (A) in the presence of (2) the blowing agent blend, (3) water, (4) a catalyst, and (5) a silicon surfactant. Optionally, other components such as a flame retardant, other additives, and/or fillers, etc. may be added. The rigid foams of the present invention may be prepared by blending all of the components of the isocyanate reactive component (B) together in a phase stable mixture, and then mixing this in the proper ratio with the organic polyisocyanate (A). Alternatively, one or more of the components, such as the silicon surfactant, may be combined with the organic polyisocyanate prior to mixing it with the isocyanate reactive component (B). Other possible embodiments of the invention would include adding one or more of the components as a separate stream, together with the isocyanate reactive component (B) and organic polyisocyanate (A).

Many foam machines are designed to condition and mix only two components in the proper ratio. For use of these machines, a premix of all the components except the polyisocyanate can be advantageously employed. According to the two-component method (component A: polyisocyanate; and component B: isocyanate reactive composition which typically includes the polyol, blowing agent, water, catalyst and surfactant), the components may be mixed in the proper ratio at a temperature of 5 to 50° C., such as 15 to 35° C., injected or poured into a mold having the temperature controlled to within a range of from 20 to 70° C., such as 35 to 60° C. The mixture then expands to fill the cavity with the rigid polyurethane foam. This simplifies the metering and mixing of the reacting components which form the polyurethane foam-forming mixture, but requires that the isocyanate reactive composition be phase stable.

Alternatively, the rigid polyurethane foams may also be prepared by the so-called "quasi prepolymer" method. In this method, a portion of the polyol component is reacted in the absence of the urethane-forming catalysts with the polyisocyanate component in proportion so as to provide from 10 percent to 35 percent of free isocyanate groups in the reaction product based on the prepolymer. To prepare foam, the remaining portion of the polyol is added and the components are allowed to react together in the presence of the blowing agent and other appropriate additives such as the catalysts, surfactants, water, etc. Other additives may be added to either the isocyanate prepolymer or remaining polyol or both prior to the mixing of the components, whereby at the end of the reaction, rigid polyurethane foam is provided.

Furthermore, the rigid polyurethane foam can be prepared in a batch or continuous process by the one-shot or quasi-prepolymer methods using any well-known foaming apparatus. The rigid polyurethane foam may be produced in the form of slab stock, moldings, cavity fillings, sprayed foam, frothed foam or laminates with other materials such as hardboard, plasterboard, plastics, paper or metal as facer substrates.

The compositions and processes of the present invention provide a substantially closed-cell rigid polyurethane foam with a thermal conductivity of less than 0.126 BTU-in/hr-ft$^2$-° F. at 35° F.

For closed-cell insulating foams, the object is to retain the blowing agent in the cells to maintain a low thermal conductivity of the insulating material, i.e., the rigid polyurethane foam. Thus, a high closed-cell content in the foam is desirable. Foams produced according to various embodiments of the present invention have more than 80 percent, typically more than 85 percent, or more than 88 percent closed-cell content as measured according to ASTM D6226-15. Furthermore, the thermal conductivity of foams produced according to various embodiments of the present invention indicates that the foams have acceptable insulating properties. Typical thermal conductivity measured at 35° F. (2° C.) is less than 0.126 BTU-in/h-ft$^2$-° F., and measured at 75° F. (24° C.) is less than 0.142 BTU-in/h-ft$^2$-° F., for foam from the core of 2-inch thick panels, as measured according to ASTM C518-15.

The invention also relates to the use of rigid polyurethane foams according to the invention for thermal insulation. That is, the rigid polyurethane foams of the present invention may find use as an insulating material in refrigeration apparatuses since the combination of good thermal insulation, high strength, good blowing agent solubility and rapid curing (short mold dwell time) is particularly appropriate here. The rigid foams according to the invention can be used, for example, as an intermediate layer in composite elements or for filling hollow spaces of refrigerators and freezers, or refrigerated trailers. The inventive foams may also find use in the construction industry or for thermal insulation of long-distance heating pipes and containers.

As such, the present invention also provides a composite article comprising rigid polyurethane foam as disclosed herein sandwiched between one or more facer substrates. In certain embodiments, the facer substrate may be plastic, paper, wood, or metal. For example, in certain embodiments, the composite article may be a refrigeration apparatus such as a refrigerator, freezer, or cooler with an exterior metal shell and interior plastic liner. In certain embodiments, the refrigeration apparatus may be a trailer, and the composite article may include the polyurethane foams produced according to the present invention in sandwich composites for trailer side-walls.

Certain embodiments of the invention are therefore directed to rigid foam which comprises the reaction product of: (A) a diisocyanate or polyisocyanate component; (B) an isocyanate-reactive component comprising: (1) a polyol blend comprising: (a) from 20 to 50% by weight, based on 100% by weight of (1), of at least one saccharide initiated polyether polyol having an OH number of from 300 to 550 mg KOH/g and a functionality of from 4 to 6; (b) from 40 to 55% by weight, based on 100% by weight of (1), of at least one aromatic amine initiated polyether polyol having an OH number of from 250 to 500 mg KOH/g and a functionality of from 3 to 5; and (c) from about 10 to about 25% by weight, based on 100% by weight of (1), of at least one aromatic polyester polyol having an OH number of 150 to 410 mg KOH/g and a functionality of about 1.5 to about 3; wherein (i) the polyol blend (1) comprises less than 15% by weight of said aromatic polyester polyol, and/or less than 18% by weight of ethylene oxide, based on 100% by weight of components (a) and (b) in the polyol blend (1); (2) a blowing agent mixture comprising: (a) 25 to 75% by weight of one or more hydrocarbon blowing agents which contain from 4 to 6 carbon atoms; and (b) 25 to 75% by weight of one or more halogenated olefin compounds which contains 3 or 4 carbon atoms, contains at least one carbon-carbon double bond, and has a boiling point of −25° C. to 40° C.; (3) from about 0.5 to about 3% by weight, based on 100% by weight of (B) said isocyanate-reactive component, of water (4) one or more catalysts; and (5) one or more silicon surfactants.

In certain embodiments, the invention is directed to the rigid foam of the previous paragraph in which (2) the blowing agent mixture comprises: (a) from 25 to 60% by weight of one or more hydrocarbon blowing agents; and (b) from 40 to 75% by weight one or more halogenated olefin compounds.

In certain embodiments, the invention is directed to the rigid foam of the previous two paragraphs in which (2) the blowing agent mixture comprises: (a) from 40 to 60% by weight of one or more hydrocarbon blowing agents; and (b) from 40 to 60% by weight one or more halogenated olefin compounds.

In certain embodiments, the invention is directed to the rigid foam of the previous three paragraphs in which (1)(c) the aromatic polyester polyol has an OH number of from about 200 to about 360 and a functionality of about 1.9 to about 2.5.

In certain embodiments, the invention is directed to the rigid foam of the previous four paragraphs in which(1)(c) the aromatic polyester polyol has an OH number of from about 200 to about 325 and a functionality of about 2.

In certain embodiments, the invention is directed to the rigid foam of the previous five paragraphs wherein (B) said isocyanate-reactive component is a phase stable blend.

In certain embodiments, the invention is directed to the rigid foam of the previous six paragraphs wherein (ii) the polyol blend (1) comprises at least 10% by weight of said aromatic polyester polyol, and/or less than 4% by weight of ethylene oxide, based on 100% by weight of components (a) and (b) in said polyol blend (1).

In certain embodiments, the invention is directed to the rigid foam of the previous seven paragraphs, wherein (ii) said polyol blend (1) comprises at least 10% by weight of said aromatic polyester polyol and the resultant foam has a k-factor of less than 0.126 BTU-in/hr-ft$^2$-° F. at 35° C.

In certain embodiments, the invention is directed to the rigid foam of the previous eight paragraphs wherein (B) said isocyanate-reactive component comprises: (1) a polyol blend comprising: (a) at least one saccharide polyether polyol in which the initiator comprises sucrose; (b) at least one aromatic amine initiated polyether polyol in which the initiator comprises o-toluenediamine; and (c) at least one aromatic polyester polyol; and (2) a blowing agent mixture comprising: (a) one or more hydrocarbon blowing agents comprising cyclopentane; and (b) one or more halogenated olefin compounds selected from the group consisting of: trans-1-chloro-3,3,3-trifluoropropene and cis-1,1,1,4,4,4-hexafluorobutene.

In certain embodiments, the invention is directed to a process for preparing a rigid foam which comprises (I) reacting: (A) a diisocyanate or polyisocyanate component; (B) an isocyanate-reactive component comprising: (1) a polyol blend comprising: (a) from 20 to 50% by weight, based on 100% by weight of (1), of at least one saccharide initiated polyether polyol having an OH number of from 300 to 550 mg KOH/g and a functionality of from 4 to 6; (b) from 40 to 55% by weight, based on 100% by weight of (I), of at least one aromatic amine initiated polyether polyol having an OH number of from 250 to 500 mg KOH/g and a functionality of from 3 to 5; and (c) from about 10 to about 25% by weight, based on 100% by weight of (I), of at least one aromatic polyester polyol having an OH number of 150 to 410 mg KOH/g and a functionality of about 1.5 to about 3; wherein (i) the polyol blend (1) comprises less than 15% by weight of said aromatic polyester polyol, and/or less than 18% by weight of ethylene oxide, based on 100% by weight of components (a) and (b) in the polyol blend (1); (2) a blowing agent mixture comprising: (a) 25 to 75% by weight of one or more hydrocarbon blowing agents which contain from 4 to 6 carbon atoms; and (b) 25 to 75% by weight of one or more halogenated olefin compounds which contains 3 or 4 carbon atoms, contains at least one carbon-carbon double bond, and has a boiling point of −25° C. to 40° C.; (3) from about 0.5 to about 3% by weight, based on 100% by weight of (B) said isocyanate-reactive component, of water; (4) one or more catalysts; and (5) one or more silicon surfactants.

In certain embodiments the invention is directed to the process of the previous paragraph in which (2) the blowing agent mixture comprises: (a) from 25 to 60% by weight of one or more hydrocarbon blowing agents; and (b) from 40 to 75% by weight one or more halogenated olefin compounds.

In certain embodiments the invention is directed to the process of the previous two paragraphs in which (2) the blowing agent mixture comprises: (a) from 40 to 60% by weight of one or more hydrocarbon blowing agents; and (b) from 40 to 60% by weight one or more halogenated olefin compounds.

In certain embodiments the invention is directed to the process of the previous three paragraphs in which(1)(c) the aromatic polyester polyol has an OH number of from about 200 to about 360 and a functionality of about 1.9 to about 2.5.

In certain embodiments the invention is directed to the process of the previous four paragraphs in which(1)(c) the aromatic polyester polyol has an OH number of from about 200 to about 325 and a functionality of about 2.

In certain embodiments the invention is directed to the process of the previous five paragraphs wherein (B) said isocyanate-reactive component is a phase stable blend.

In certain embodiments, the invention is directed to the process of the previous six paragraphs wherein (ii) the polyol blend (1) comprises at least 10% by weight of said aromatic polyester polyol, and/or less than 4% by weight of ethylene oxide, based on 100% by weight of components (a) and (b) in said polyol blend (1).

In certain embodiments, the invention is directed to the process of the previous seven paragraphs wherein (ii) said polyol blend (1) comprises at least 10% by weight of said aromatic polyester polyol and the resultant foam has a k-factor of less than 0.126 BTU-in/hr-ft$^2$-° F. at 35° C.

In certain embodiments, the invention is directed to the process of the previous eight paragraphs wherein (B) said isocyanate-reactive component comprises: (1) a polyol blend comprising: (a) at least one saccharide polyether polyol in which the initiator comprises sucrose; (b) at least one aromatic amine initiated polyether polyol in which the initiator comprises o-toluenediamine; and (c) at least one aromatic polyester polyol; and (2) a blowing agent mixture comprising: (a) one or more hydrocarbon blowing agents comprising cyclopentane; and (b) one or more halogenated olefin compounds selected from the group consisting of: trans-1-chloro-3,3,3-trifluoropropene and cis-1,1,1,4,4,4-hexafluorobutene Another embodiment of the invention is directed to a phase stable isocyanate-reactive blend which comprises (1) a polyol blend comprising: (a) from 20 to 50% by weight, based on 100% by weight of (1), of at least one polyether polyol having an OH number of from 300 to 550 and a functionality of from 4 to 6; (b) from 40 to 55% by weight, based on 100% by weight of (1), of at least one aromatic amine initiated polyether polyol having an OH number of from 250 to 500 and a functionality of from 3 to 5; and (c) from about 10 to about 25% by weight, based on 100% by weight of (1), of at least one aromatic polyester polyol having an OH number of 150 to 410 and a functionality of about 1.5 to about 3; wherein (i) the polyol blend (1) comprises less than 15% by weight of said aromatic polyester polyol, and/or less than 18% by weight of ethylene oxide, based on 100% by weight of components (a) and (b) in said polyol blend (1); and (2) a blowing agent mixture comprising: (a) 25 to 75% by weight of one or more hydrocarbon blowing agents which contain from 4 to 6 carbon atoms; and (b) 25 to 75% by weight of one or more halogenated olefin compounds which contains 3 or 4 carbon atoms, and at least one carbon-carbon double bond, and has a boiling point of −25° C. to 40° C.

In another embodiment, the invention is directed to the phase stable isocyanate-reactive blend of the previous paragraph wherein (2) said blowing agent mixture comprises: (a) from 25 to 60% by weight of one or more hydrocarbon blowing agents; and (b) from 40 to 75% by weight one or more halogenated olefin compounds.

In another embodiment, the invention is directed to the phase stable isocyanate-reactive blend of the previous two paragraphs wherein (2) said blowing agent mixture comprises: (a) from 40 to 60% by weight of one or more hydrocarbon blowing agents; and (b) from 40 to 60% by weight one or more halogenated olefin compounds.

In another embodiment, the invention is directed to the phase stable isocyanate-reactive blend of the previous three paragraphs wherein (1)(c) said aromatic polyester polyol has an OH number of from about 200 to about 360 and a functionality of about 1.9 to about 2.5.

In another embodiment, the invention is directed to the phase stable isocyanate-reactive blend of the previous four paragraphs wherein (1)(c) said aromatic polyester polyol has an OH number of from about 200 to about 325 and a functionality of about 2.

In another embodiment, the invention is directed to the phase stable isocyanate-reactive blend of the previous five paragraphs wherein (ii) said polyol blend (1) comprises at least 10% by weight of said aromatic polyester polyol, and/or less than 4% by weight of ethylene oxide, based on 100% by weight of components (a) and (b) in said polyol blend (1).

In another embodiment, the invention is directed to the phase stable isocyanate-reactive blend of the previous six paragraphs wherein (ii) said polyol blend (1) comprises at least 10% by weight of said aromatic polyester polyol and the resultant foam has a k-factor of less than 0.126 BTU-in/hr-ft2-° F. at 35° C.

In another embodiment, the invention is directed to the phase stable isocyanate-reactive blend of the previous seven paragraphs wherein (B) said isocyanate-reactive component comprises: (1) a polyol blend comprising: (a) at least one saccharide polyether polyol in which the initiator comprises sucrose; (b) at least one aromatic amine initiated polyether polyol in which the initiator comprises o-toluenediamine; and (c) at least one aromatic polyester polyol; and (2) a blowing agent mixture comprising: (a) one or more hydrocarbon blowing agents comprising cyclopentane; and (b) one or more halogenated olefin compounds selected from the group consisting of: trans-1-chloro-3,3,3-trifluoropropene and cis-1,1,1,4,4,4-hexafluorobutene.

Having thus described our invention, the following examples are given as being illustrative thereof. All parts and percentages given in these examples are parts by weight and percentages by weight, unless otherwise indicated. Unless otherwise noted, all temperatures are degrees Celsius.

EXAMPLES

The following materials were used in the working examples:

Polyol 1: a sucrose-initiated polyether polyol having an OH number of about 470 mg KOH/g and a functionality of about 4.7, prepared by propoxylating a mixture of sucrose, glycerine, and water.

Polyol 2: a sucrose-initiated polyether polyol having an OH number of about 470 mg KOH/g and a functionality of about 5.5, prepared by ethoxylating, and then propoxylating a mixture of sucrose, propylene glycol, and water. Ethylene oxide makes up 20% of this polyol.

Polyol 3: a sucrose-initiated polyether polyol having an OH number of about 470 mg KOH/g and a functionality of about 5.2, prepared by propoxylating a mixture of sucrose, propylene glycol, and water.

Polyol 4: an aromatic amine initiated polyether polyol having an OH number of about 360 mg KOH/g and a nominal functionality of 4, prepared by propoxylating a mixture of 2,3-toluene diamine and 3,4-toluene diamine.

Polyol 5: an aromatic amine initiated polyether polyol having an OH number of about 390 mg KOH/g and a nominal functionality of 4, prepared by ethoxylating, and then propoxylating a mixture of 2,3-toluene diamine and 3,4-toluene diamine, with ethylene oxide making up 27% of the polyol.

Polyol 6: an aromatic polyester polyol having an OH number of about 315 mg KOH/g and a functionality of about 2.4, commercially available from Stepan Company as Stepanpol® PS 3024.

Polyol 7: an aromatic polyester polyol having an OH number of about 240 mg KOH/g and a functionality of 2, commercially available from Stepan Company as Stepanpol® PS-2502-A.

Polyol 8: a polyether polyol having an OH number of about 240 mg KOH/g and a functionality of 3, prepared by propoxylation of glycerine.

Polyol 9: a polyether polyol having an OH number of about 112 mg KOH/g and a functionality of 2, prepared by propoxylation of propylene glycol.

Polyol 10: a polyether polyol having an OH number of about 630 mg KOH/g and a functionality of 4, prepared by propoxylation of ethylene diamine.

SURF A: a silicon surfactant commercially available from Evonik Industries under the trade name Tegostab® B-8465.

SURF B: a silicon surfactant commercially available from Air Products and Chemicals, Inc. under the trade name Dabco® Si-3201.

SURF C: a silicon surfactant commercially available from Air Products and Chemicals, Inc. under the trade name Dabco® Si-3102.

SURF D: a silicon surfactant commercially available from Air Products and Chemicals, Inc. under the trade name Dabco® DC-5357.

CAT A: pentamethyldiethylenetriamine which is a tertiary amine urea (blow) catalyst commercially available from Air Products and Chemicals, Inc. under the trade name Polycat® 5.

CAT B: N,N-dimethylcyclohexyl amine which is a tertiary amine urethane (gel) catalyst commercially available from Air Products and Chemicals, Inc. under the trade name Polycat® 8.

CAT C: 1,3,5-tris(3-(dimethylamino)propyl)-hexahydro-s-triazine which is a tertiary amine isocyanurate (trimer) catalyst commercially available from Air Products and Chemicals, Inc. under the trade name Polycat® 41.

CAT D: a solution of potassium octoate in diethylene glycol, which is an organometallic salt isocyanurate (trimer) catalyst commercially available from Air Products and Chemicals, Inc. under the trade name Dabco® K-15.

c-Pentane: cyclopentane, a hydrocarbon blowing agent which has a boiling point of 49° C.

HCFO 1233zd(E): trans-1,1,1-trifluoro-3-chloropropene, a hydrochlorofluoro olefin blowing agent which has a boiling poing of 19° C.

HFO 1336mzz(Z): cis-1,1,1,4,4,4-hexafluorobutene, a hydrofluoroolefin blowing agent which has a boiling point of 33° C.

ISO A: a polymeric diphenylmethane diisocyanate (PMDI) prepolymer with a NCO content of about 30.5% and a viscosity of about 350 centipoise at 25° C.

ISO B: a polymeric diphenylmethane diisocyanate (PMDI) with a NCO content of about 31.8% and a viscosity of about 200 centipoise at 25° C.

Polyol Blends A-G

Polyol blends A-G are described in Table 1. These were prepared by mixing Polyols 1-10 in the weight ratios shown. The amount of aromatic polyester polyol, sucrose initiated polyether polyol, and aromatic amine polyether polyol present in each blend is summarized at the bottom of Table 1. In addition, the amount of polymerized ethylene oxide (EO) present in the polyether polyols of each blend is calculated for each blend.

Examples 1-9 and Comparative Examples 1-11

Table 2A and 2B summarize examples and comparative examples using blends of cyclopentane and HCFO 1233zd (E) and Tables 3A and 3B summarize the examples and comparative examples using blends of cyclopentane and HFO 1336mzz(Z). A master batch of each material was prepared by mixing the polyol blend, catalysts, surfactant, water and blowing agents in the amounts indicated in Tables 2A and 3A. Each master batch was examined after 7 days to check for separation and the masterbatch blends were used to prepare foams. Foams were prepared by mixing the masterbatch with the amount of isocyanate indicated in Tables 2A and 2B and either pouring the mixture into an 83 ounce paper cup to determine reactivity, or into a 25 inch×13 inch×2 inch metal mold heated to 49° C. to obtain foam properties. The cream time, gel time, tack-free time, closed cell content, and k-factors at both 35° and 75° F. were recorded and are summarized in Tables 2B and 3B.

Examples 10-11

Table 4 summarizes the formulations used and results obtained from evaluations performed using a high pressure foam machine. In Examples 10 and 11, the materials listed were blended to form the isocyanate reactive component. Foams were prepared using a high pressure foam machine equipped with a Hennecke MQ-18 mix head. The liquid output was adjusted to a nominal 60 lb/minute and the recycle and pour pressures were held at 1500 psig. All evaluations were done using a Bosch panel mold with internal dimensions of 79 inches high by 8 inches wide by 2 inches thick and held at 120° F. The pre-foam mixture was injected into the mold through the pour hole located near the bottom while the mold was held in a vertical position. The minimum fill density was determined from three under-filled panels of various weights using a linear regression to determine the minimum weight of foam required to just fill the mold's interior volume. Packed panels for testing were then prepared at densities above the minimum fill density as shown in the Table.

Measurement of all foam properties was conducted using standard methods. Foam density was measured according to ASTM D-1622. Measurement of k-factors were performed on 8×8×1 inch core foam samples using a LaserComp FOX 200 heat flow meter according to ASTM C-518. Closed cell contents were measured using a Gas Pycnometer according to ASTM D-6226. Compressive strength was measured perpendicular to flow at 10% compression following ASTM D-1621. Dimensional Stability was measured at −30 and +70° C. (−22 and +158° F.) according to ASTM D-2126.

TABLE 1

| Polyol Blend | A | B | C | D | E | F | G | H |
|---|---|---|---|---|---|---|---|---|
| Polyol 1 | 50.0 |  | 50.0 |  |  |  |  |  |
| Polyol 2 |  | 20.0 |  | 40.0 |  | 20.0 | 20.0 |  |
| Polyol 3 |  |  |  |  | 20.0 |  |  | 40.0 |
| Polyol 4 | 40.0 |  | 40.0 |  |  |  | 55.0 | 40.0 |
| Polyol 5 |  | 55.0 |  | 45.0 | 55.0 | 55.0 |  |  |
| Polyol 6 |  |  | 10.0 |  |  |  |  |  |
| Polyol 7 | 10.0 | 25.0 |  | 15.0 | 25.0 |  | 25.0 |  |
| Polyol 8 |  |  |  |  |  | 25.0 |  |  |
| Polyol 9 |  |  |  |  |  |  |  | 10.0 |
| Polyol 10 |  |  |  |  |  |  |  | 10.0 |
| Total PBW Polyol Blend | 100.0 | 100.0 | 100.0 | 100.0 | 100.0 | 100.0 | 100.0 | 100.0 |
| % Aromatic Polyester Polyol | 10.0 | 25.0 | 10.0 | 15.0 | 25.0 | 0.0 | 25.0 | 0.0 |
| % Sucrose Initiated Polyether Polyol | 50.0 | 20.0 | 50.0 | 40.0 | 20.0 | 20.0 | 20.0 | 40.0 |
| % Aromatic Amine Initiated Polyether Polyol | 40.0 | 55.0 | 40.0 | 45.0 | 55.0 | 55.0 | 55.0 | 40.0 |
| % EO in Polyether Polyol (EO/PET) | 0.0 | 0.0 | 5.2 | 19.9 | 18.9 | 0.0 | 25.2 | 23.7 |

TABLE 2A

| | \multicolumn{10}{c}{Example} | | | | | | | | | |
|---|---|---|---|---|---|---|---|---|---|---|
| | Ex 1 | Ex 2 | Ex 3 | Ex 4 | Comp. Ex 1 | Comp. Ex 2 | Comp. Ex 3 | Comp. Ex 4 | Comp. Ex. 5 | Comp. Ex. 6 |
| Polyol Blend | A | B | C | C | C | D | E | F | G | H |
| Polyol Blend Amount | 78.65 | 79.71 | 76.13 | 78.64 | 80.51 | 78.64 | 78.64 | 78.96 | 79.29 | 77.46 |
| Surf A | 1.97 | | | | | | | | 1.96 | |
| Surf B | | 1.50 | | | | | | | | |
| Surf C | | | 2.76 | 2.80 | 2.83 | 2.80 | 2.80 | | | |
| Surf D | | | | | | | | | 2.95 | 2.80 |
| Cat A | 0.37 | 1.42 | 0.60 | 0.60 | 0.61 | 0.60 | 0.60 | 0.49 | 1.10 | 1.22 |
| Cat C | | 0.71 | 0.30 | 0.30 | 0.31 | 0.30 | 0.30 | | 0.55 | 0.61 |
| Water | 1.87 | 1.76 | 1.78 | 1.80 | 1.82 | 1.80 | 1.80 | 1.79 | 0.97 | 1.07 |
| c-pentane | 7.74 | 7.45 | 4.61 | 7.93 | 10.44 | 7.93 | 7.93 | 7.71 | 7.57 | 8.42 |
| HCFO 1233zd(E) | 7.74 | 7.45 | 13.82 | 7.93 | 3.48 | 7.93 | 7.93 | 7.71 | 7.57 | 8.42 |
| Total Master Batch | 100.0 | 100.0 | 100.0 | 100.0 | 100.0 | 100.0 | 100.0 | 100.0 | 100.0 | 100.0 |
| Master Batch Appearance | Clear | Clear | Clear | Clear | Clear | Clear | Clear | Clear | Separated | Separated |
| Iso A | 118 | 145 | 103 | 106 | 108 | 106 | 106 | | 106 | 129 |
| Iso B | | | | | | | | 118 | | |

TABLE 2B

| | \multicolumn{10}{c}{EXAMPLE} | | | | | | | | | |
|---|---|---|---|---|---|---|---|---|---|---|
| HANDMIX PROPERTIES | Ex 1 | Ex 2 | Ex 3 | Ex 4 | Comp Ex 1 | Comp Ex 2 | Comp Ex 3 | Comp Ex 4 | Comp Ex 5 | Comp Ex 6 |
| CUP REACTIVITY | | | | | | | | | | |
| Cream Time, Secs | 8 | 2 | 7 | 4 | 7 | 7 | 7 | 7 | Not recorded | 13 |
| Gel Time, Secs | 45 | 34 | 44 | 40 | 43 | 48 | 56 | 44 | 31 | 41 |
| Tack Free Time, Secs | 65 | 40 | 70 | 60 | 63 | 84 | 96 | 84 | 37 | 67 |
| TEST PANELS | | | | | | | | | | |
| Closed Cells, % | 92.2 | 91.4 | 91.0 | 91.2 | 90.8 | 90.9 | 90.3 | 90.1 | 89.9 | 90.6 |
| 35° F. k-Factor, BTU-in/hr-ft$^2$-° F. | 0.123 | 0.124 | 0.121 | 0.123 | 0.130 | 0.127 | 0.127 | 0.128 | 0.119 | 0.123 |
| 75° F. k-Factor, BTU-in/hr-ft$^2$-° F. | 0.137 | 0.141 | 0.136 | 0.136 | 0.142 | 0.140 | 0.142 | 0.143 | 0.133 | 0.138 |

TABLE 3A

| | \multicolumn{9}{c}{Example} | | | | | | | | |
|---|---|---|---|---|---|---|---|---|---|
| | Ex. 5 | Ex. 6 | Ex. 7 | Ex. 8 | Ex. 9 | Comp. Ex. 7 | Comp. Ex. 8 | Comp. Ex. 9 | Comp. Ex. 10 | Comp. Ex. 11 |
| Polyol Blend | A | B | B | B | D | C | E | F | G | H |
| Polyol Blend Amount | 77.62 | 75.33 | 78.75 | 81.14 | 77.53 | 77.53 | 77.53 | 77.9 | 78.25 | 76.33 |
| Surf A | 1.94 | | | | | | | 1.95 | | |
| Surf B | | 1.44 | 1.48 | 1.51 | | | | | | |
| Surf C | | | | | 2.80 | 2.80 | 2.80 | | | |
| Surf D | | | | | | | | | 2.92 | 2.78 |
| Cat A | 0.37 | 1.36 | 1.40 | 1.42 | 0.60 | 0.60 | 0.60 | 0.49 | 1.10 | 1.22 |
| Cat B | 1.64 | | | | | | | 1.37 | | |
| Cat C | | 0.68 | 0.70 | 0.71 | 0.30 | 0.30 | 0.30 | | 0.55 | |
| Cat D | | | | | | | | | | 0.61 |
| Water | 1.85 | 1.71 | 1.75 | 1.78 | 1.79 | 1.79 | 1.79 | 1.77 | 0.96 | 1.06 |

TABLE 3A-continued

|  | Ex. 5 | Ex. 6 | Ex. 7 | Ex. 8 | Ex. 9 | Comp. Ex. 7 | Comp. Ex. 8 | Comp. Ex. 9 | Comp. Ex. 10 | Comp. Ex. 11 |
|---|---|---|---|---|---|---|---|---|---|---|
| c-pentane | 8.29 | 4.87 | 7.96 | 10.08 | 8.49 | 8.49 | 8.49 | 8.26 | 8.11 | 9.00 |
| HFO 1336mzz(Z) | 8.29 | 14.61 | 7.96 | 3.36 | 8.49 | 8.49 | 8.49 | 8.26 | 8.11 | 9.00 |
| Total Master Batch | 100.00 | 100.00 | 100.00 | 100.00 | 100.00 | 100.00 | 100.00 | 100.00 | 100.00 | 100.00 |
| Master Batch Appearance | Clear | Clear | Clear | Clear | Clear | Clear | Clear | Clear | Separated | Separated |
| Iso A | 116 | 138 | 143 | 147 | 105 | 105 | 105 |  | 105 | 127 |
| Iso B |  |  |  |  |  |  |  | 116 |  |  |

TABLE 3B

| HAND MIX PROPERTIES | Ex. 5 | Ex. 6 | Ex. 7 | Ex. 8 | Ex. 9 | Comp. Ex. 7 | Comp. Ex. 8 | Comp. Ex. 9 | Comp. Ex. 10 | Comp. Ex. 11 |
|---|---|---|---|---|---|---|---|---|---|---|
| CUP REACTIVITY |  |  |  |  |  |  |  |  |  |  |
| Cream Time, Secs | 7 | 5 | 2 | 5 | 8 | 4 | 8 | 7 | 4 | 6 |
| Gel Time, Secs | 45 | 38 | 34 | 37 | 48 | 40 | 56 | 44 | 31 | 41 |
| Tack Free Time, Secs | 61 | 62 | 58 | 57 | 85 | 60 | 104 | 83 | 49 | 68 |
| TEST PANELS |  |  |  |  |  |  |  |  |  |  |
| Closed Cells, % | 91.7 | 91.0 | 91.0 | 90.9 | 91.5 | 90.4 | 89.8 | 90.7 | 92.0 | 93.0 |
| 35° F. k- Factor, BTU-in/hr-ft$^2$-° F. | 0.125 | 0.121 | 0.122 | 0.125 | 0.124 | 0.127 | 0.128 | 0.127 | 0.119 | 0.120 |
| 75° F. k-Factor, BTU-in/hr-ft$^2$-° F. | 0.140 | 0.134 | 0.136 | 0.138 | 0.138 | 0.142 | 0.145 | 0.143 | 0.131 | 0.134 |

TABLE 4

|  | Ex. 10 | Ex. 11 |
|---|---|---|
| Polyol Blend | C | B |
| Polyol Blend Amount | 78.64 | 76.90 |
| Surfactant C | 2.80 | 1.54 |
| Catalyst A | 0.60 | 0.90 |
| Catalyst C | 0.30 | 0.45 |
| Water | 1.80 | 1.93 |
| c-Pentane | 7.93 | 9.14 |
| HCFO 1233zd(E) | 7.93 | 0 |
| HFO 1336mzz(Z) | 0 | 9.14 |
| Total Isocyanate Reactive Composition | 100.00 | 100.00 |
| Isocyanate A | 106.0 | 133.7 |
| PROPERTIES: |  |  |
| Gel Time, secs | 37 | 39 |
| Free Rise Density, lb./ft$^3$ | 1.35 | 1.36 |
| Min. Fill Density, lb./ft$^3$ | 1.89 | 1.88 |
| Packed Density, lb./ft$^3$ | 2.12 | 2.08 |
| Core density, lb./ft$^3$ | 1.85 | 1.82 |
| 35° F. k-Factor, BTU-in/hr-ft$^2$-° F. | 0.122 | 0.123 |
| 75° F. k-Factor, BTU-in/hr-ft$^2$-° F. | 0.132 | 0.137 |
| Compressive Strength, lb./in$^2$ | 19.1 | 19.2 |
| Closed Cells, % | 91.9 | 92.4 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A phase stable isocyanate-reactive blend comprising:
   (1) a polyol blend consisting essentially of:
      (a) 20 to 50% by weight, based on 100% by weight of (1), of at least one saccharide-initiated polyether polyol having an OH number of from 300 to 550 and a functionality of from 4 to 6, in which the initiator comprises (i) sucrose, (ii) either glycerin or propylene glycol, and (iii) water, with the proviso that the initiator of said saccharide polyether polyol (1)(a) excludes sorbitol;
      (b) 40 to 55% by weight, based on 100% by weight of (1), of at least one aromatic amine-initiated polyether polyol having an OH number of from 250 to 420 and a functionality of from 3 to 5, and is the reaction product of an H-functional initiator consisting essentially of an aromatic amine compound with an alkylene oxide;
      and
      (c) about 10 to about 25% by weight, based on 100% by weight of (1), of at least one aromatic polyester polyol having an OH number of 150 to 410 and a functionality of about 1.5 to about 3;
   with the proviso that the phase stable isocyanate-reactive blend is clear and the polyol blend (1) comprises (i) at least 10% by weight and less than 15% by weight of said aromatic polyester polyol, based on 100% by weight of said polyol blend (1), and/or (ii) less than 18% by weight of ethylene oxide, based on 100% by weight of components (a) and (b) in said polyol blend (1);

(2) a blowing agent mixture comprising
  (a) 2.5 to 75% by weight of one or more hydrocarbon blowing agents comprising cyclopentane;
  (b) 25 to 75% by weight of trans-1-chloro-3,3,3-trifluoropropene; and, optionally,
  (c) an additional blowing agent;
  wherein the sum of (2)(a), (2)(b) and (2)(c) totals 100% by weight of (2); and
(3) 0.8 to 3.0% by weight of water, based on 100% by weight of the isocyanate-reactive blend.

2. The phase stable isocyanate-reactive blend of claim 1, wherein said blowing agent mixture comprises:
  (a) 25 to 60% by weight, based on the total weight of the blowing agent mixture, of cyclopentane; and
  (b) 40 to 75% by weight of, based on the total weight of the blowing agent mixture of trans-1-chloro-3,3,3-trifluoropropene.

3. The phase stable isocyanate-reactive blend of claim 2, wherein said blowing agent mixture comprises:
  (a) 40 to 60% by weight, based on the total weight of the blowing agent mixture, of cyclopentane; and
  (b) 40 to 60% by weight, based on the total weight of the blowing agent mixture, of trans-1-chloro-3-3-3-trifluoropropene.

4. The phase stable isocyanate-reactive blend of claim 1, wherein said aromatic polyester polyol has an OH number of 200 to 360 and a functionality of about 1.9 to about 2.5.

5. The phase stable isocyanate-reactive blend of claim 4, wherein said aromatic polyester polyol has an OH number of 200 to about 325 and a functionality of about 2.

6. The phase stable isocyanate-reactive blend of claim 1, wherein the initiator of the at least one saccharide-initiated polyether polyol having an OH number of from 300 to 550 and a functionality of from 4 to 6, comprises (i) sucrose, (ii) propylene glycol, and (iii) water.

7. A phase stable isocyanate-reactive blend comprising:
(1) a polyol blend consisting of:
  (a) 20 to 50% by weight, based on 100% by weight of (1), of at least one saccharide-initiated polyether polyol having an OH number of from 300 to 550 and a functionality of from 4 to 6, in which the initiator of the saccharide-initiated polyether polyol comprises sucrose and excludes sorbitol;
  (b) 40 to 55% by weight, based on 100% by weight of (1), of at least one aromatic amine initiated polyether polyol having an OH number of from 250 to 420 and a functionality of from 3 to 5, and is the reaction product of an H-functional initiator consisting essentially of an aromatic amine compound with an alkylene oxide; and
  (c) about 10 to about 25% by weight, based on 100% by weight of (1), of at least one aromatic polyester polyol having an OH number of 150 to 410 and a functionality of about 1.5 to about 3;
with the proviso that the phase stable isocyanate-reactive blend is clear and the polyol blend (1) has (i) at least 10% by weight and less than 15% by weight of said aromatic polyester polyol, based on 100% by weight of said polyol blend (1), and or (ii) less than 18% by weight of ethylene oxide, based on 100% by weight of components (a) and (b) in said polyol blend (1);
(2) a blowing agent mixture comprising:
  (a) 25 to 75% by weight of one or more hydrocarbon blowing agents comprising cyclopentane;
  (b) 25 to 75% by weight of trans-1-chloro-3,3,3-trifluoropropene;
  and, optionally,
  (c) an additional blowing agent;
  wherein the sum of (2)(a), (2)(b) and (2)(c) totals 100% by weight of (2); and
(3) 0.8 to 3.0% by weight of water, based on 100% by weight of the isocyanate-reactive blend.

8. The phase stable isocyanate-reactive blend of claim 7, comprising 10 to less than 15% by weight, based on 100% by weight of (1), of the at least one aromatic polyester polyol having an OH number of 150 to 410 and a functionality of about 1.5 to about 3.

9. The phase stable isocyanate-reactive blend of claim 7, wherein said blowing agent mixture comprises:
  (a) 25 to 60% by weight, based on the total weight of the blowing agent mixture, of cyclopentane;
  (b) 40 to 75% by weight, based on the total weight of the blowing agent mixture, of trans-1-chloro-3,3,3-trifluoropropene.

10. The phase stable isocyanate-reactive blend of claim 8, wherein said blowing agent mixture comprises:
  (a) 40 to 60% by weight, based on the total weight of the blowing agent mixture, of cyclopentane; and
  (b) 40 to 60% by weight, based on the total weight of the blowing agent mixture, of trans-1-chloro-3-3-3-trifluoropropene.

11. The phase stable isocyanate-reactive blend of claim 7, wherein said aromatic polyester polyol has an OH number of 200 to 360 and a functionality of 1.9 to 2.5.

12. The phase stable isocyanate-reactive blend of claim 11, wherein said aromatic polyester polyol has an OH number of 200 to 325 and a functionality of 2.

13. The phase stable isocyanate-reactive blend of claim 7, wherein the initiator of the at least one saccharide-initiated polyether polyol comprises: (i) sucrose, (ii) either glycerin or propylene glycol, and (iii) water.

14. The phase stable isocyanate-reactive blend of claim 13, wherein the initiator of the at least one saccharide-initiated polyether polyol having an 01-1 number of from 300 to 550 and a functionality of from 4 to 6, comprises (i) sucrose, (ii) propylene glycol, and (iii) water.

* * * * *